(12) United States Patent
Pyman et al.

(10) Patent No.: US 11,912,587 B2
(45) Date of Patent: Feb. 27, 2024

(54) MULTIFUNCTION SOLAR UTILITY PANELS

(71) Applicant: Robert James Pyman, Malvern (AU)

(72) Inventors: Robert James Pyman, Malvern (AU); Richard William Thomson, Kent Town (AU); Darren Geoffrey Dunn, Eden Park (AU)

(73) Assignee: Robert James Pyman

( * ) Notice: Subject to any disclaimer, the term of this patent is extended or adjusted under 35 U.S.C. 154(b) by 470 days.

(21) Appl. No.: 17/279,298

(22) PCT Filed: Sep. 25, 2019

(86) PCT No.: PCT/AU2019/051025
§ 371 (c)(1),
(2) Date: Mar. 24, 2021

(87) PCT Pub. No.: WO2020/061623
PCT Pub. Date: Apr. 2, 2020

(65) Prior Publication Data
US 2021/0403345 A1 Dec. 30, 2021

(30) Foreign Application Priority Data

Sep. 25, 2018 (AU) .................................. 2018903604

(51) Int. Cl.
*C02F 1/14* (2023.01)
*B01D 5/00* (2006.01)
(Continued)

(52) U.S. Cl.
CPC .............. *C02F 1/14* (2013.01); *B01D 5/0015* (2013.01); *B01D 5/006* (2013.01); *B01D 5/009* (2013.01); *F24S 10/50* (2018.05); *F24S 20/00* (2018.05); *F24S 70/10* (2018.05); *H02S 40/44* (2014.12); *C02F 2201/009* (2013.01);
(Continued)

(58) Field of Classification Search
CPC .. C02F 1/14; C02F 2201/009; C02F 2307/10; B01D 5/0015; B01D 5/006; B01D 5/009; F24S 10/50; F24S 20/00; F24S 70/10; F24S 2020/17; H02S 40/44
See application file for complete search history.

(56) References Cited

U.S. PATENT DOCUMENTS 4,329,204 A * 5/1982 Petrek .................... B01D 5/006
202/205
2015/0246826 A1 9/2015 Frolov et al.

FOREIGN PATENT DOCUMENTS

CN 101312332 A 5/2008
CN 102646742 A 8/2012

OTHER PUBLICATIONS

Manokar, A. Muthu, Solar Still—A Mini Review, Desalination (2017), http://dx.doi.org/10.1016/j.desal.2017.04.022.

* cited by examiner

*Primary Examiner* — Renee Robinson
(74) *Attorney, Agent, or Firm* — Renner, Kenner, Greive, Bobak, Taylor & Weber Co., LPA

(57) ABSTRACT

A multi-function solar panel, the panel being of the tilted tray type which is divided into three chambers, one chamber being used for electricity generation, and cooling of the PV panel and partial preheating of the feed water to a still, one for processing the feed water to produce potable water and the other for water storage and other ancillary devices used in the production process and PAYG functionality of the multi-function solar panel.

14 Claims, 8 Drawing Sheets

(51) Int. Cl.
- *F24S 10/50* (2018.01)
- *F24S 20/00* (2018.01)
- *F24S 70/10* (2018.01)
- *H02S 40/44* (2014.01)

(52) U.S. Cl.
CPC ....... *C02F 2307/10* (2013.01); *F24S 2020/17* (2018.05); *Y02A 20/211* (2018.01)

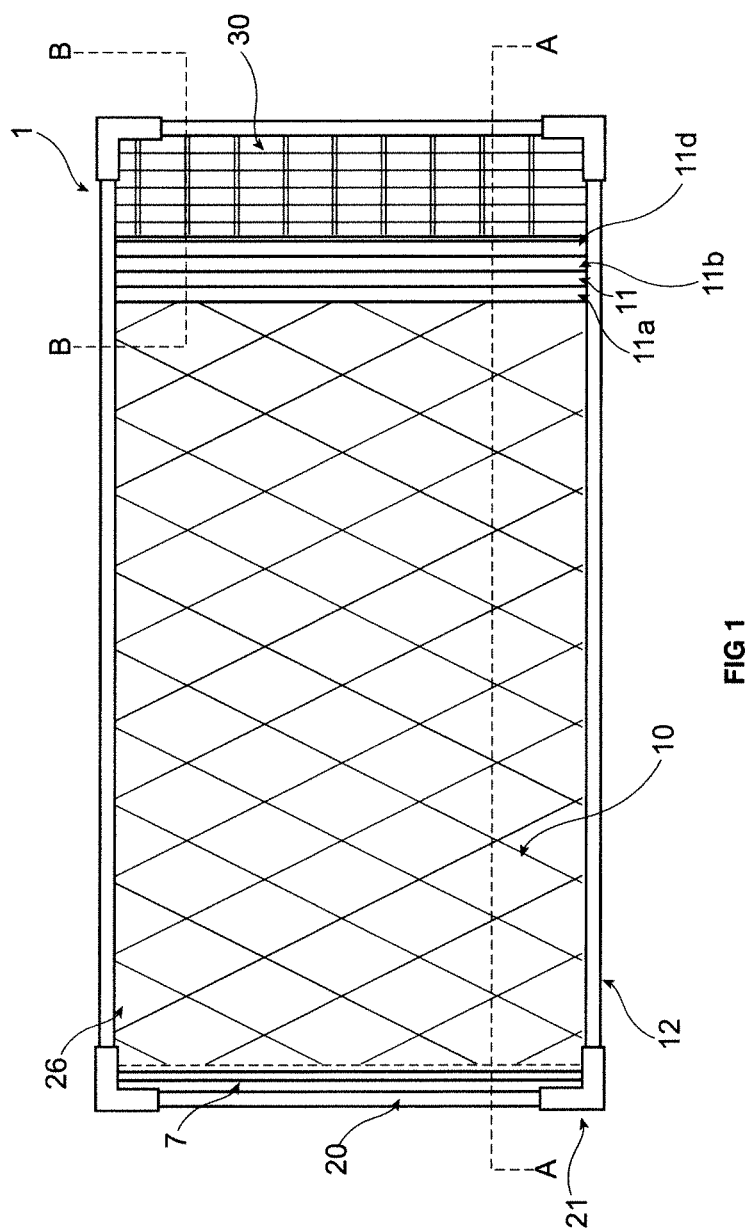

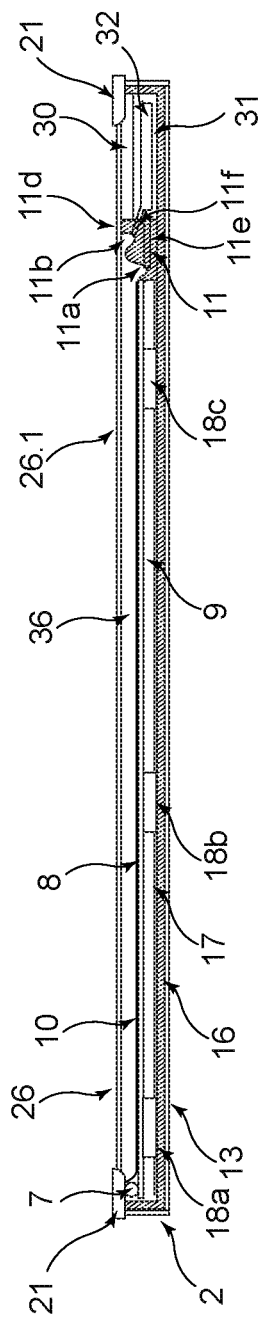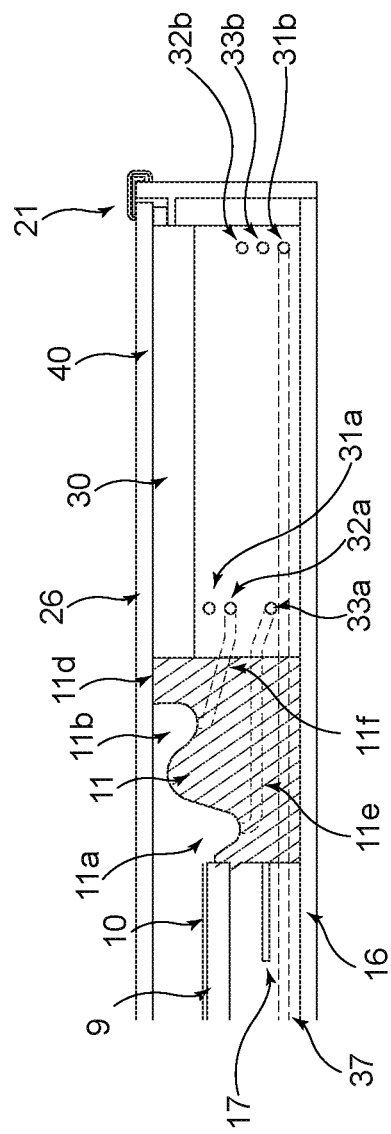

MULTIFUNCTION SOLAR UTILITY PANELS

FIELD OF THE INVENTION

This invention relates to a multi-function solar utilities panel, more particularly to a solar panel designed to produce potable drinking water and hot sanitation water, to produce electricity, to provide these resources to users on a pay-as you-go basis.

BACKGROUND TO THE INVENTION

Many households in developing countries do not have reliable access to potable water, hot water and/or electricity, and in many areas there is no infrastructure to provide these resources to individual dwellings. Those affected are forced to rely on fossil fuels to boil water if they wish to protect their health (despite the use of fossil fuels adding to pollution levels) and electricity is often simply unavailable. Many water sources are contaminated including surface and ground water.

Funding the capital cost of devices to produce adequate quantities of potable water, hot water and electricity, even at household level, is beyond the capacity of large numbers of people and communities are unable to organise to finance and manage village sized projects so in many cases it is essential to solve the funding dilemma, as well as the technical requirement of producing a reliable supply of low cost potable water.

As a result, the three resources most difficult for the majority of the populations of developing countries to access are potable water, electricity and finance.

The largest barriers to access to these resources in the developing world are:
1. A cost effective product that treats any water source to produce potable water, hot water and electricity from the one panel that is simple and easy to use and relatively maintenance free;
2. a lack of effective customer financing for high-performance, high-quality solar water purification products; and
3. a lack of solar panels designed and built to provide multiple functionality using the PAYG (pay as you go) environment available in the developing world.

A characteristic of the construction of successful solar stills is that they embody features to enhance the capture of solar energy and apply this to the production of water vapour, which then condenses to deliver the distilled water product. Other important features of solar stills may relate to their utilisation in remote areas; and may include features that facilitate their commercial utilisation remotely, as disclosed herein, and their proper technical utilisation to maximise performance when operated by untrained personnel.

Solar stills to produce potable and sterile water are required in many countries where clean pure uncontaminated water is not readily available and infrastructure for reticulation of clean water not established. Current approaches to provide sterilised water require high energy inputs such as boiling water, high pressures and/or chemical treatment.

But the challenge is to provide more than one resource from a single panel to help alleviate the fundamental needs of many people. Now while solar panels have been developed to both provide electricity and heated water, so called PV-T panels, these panels cannot produce potable water, nor do they include PAYG capability whereas the multi-function 'smart' solar panel described here-in can produce not only potable water and electricity, but also financing functionality as well as data collection capability.

BRIEF STATEMENT OF THE INVENTION

There is provided in one form of the invention a multi-function solar panel, the panel being of the tilted tray type which is essentially divided into three chambers, one chamber being used for electricity generation, and cooling of the PV panel and partial preheat of the feed water to a still, one for processing the feed water to produce potable water and the other for water storage and other ancillary devices used in the production process and PAYG functionality of the multi-function solar panel.

The multi-function solar panel can either be gravity fed with the water source being at a higher elevation than the discharge from the purifier, or pump fed using solar pump utilising power generated by the solar PV panel to deliver a water flow proportionate to the available radiation.

In certain embodiments the solar pump can be located nearby the multi-function solar panel. In other embodiments the solar pump can be located within the multi-function solar panel or attached thereto.

The still includes a frame with a base and insulation made into a single element, with a reflector sheet attached to, and insulation to maintain the thermal efficiency of the solar panel.

In the upper still section of the panel, the base, including the attached insulation and reflector sheet, supports an absorber assembly. The absorber assembly consists of the absorber base of low conductivity material, to which are attached, on the underside, a number of supporting blocks, and on the upper side, an absorber fabric with low IR (infra-red) transmittance which is fixed to the base using locking grooves in the base and retaining rods. The absorber is a solar absorber for converting the energy of the sun into heat.

The absorber assembly is fixed at the upper end by the attached supporting block but sits freely on the remaining supporting blocks and is therefore free to expand and contract without causing distortion within the frame. The glass cover is located on the top of the frame, sealed against the frame with cover strips, and sealed against the upper edge of the dual purpose product collector, and secured by pre-tensioned locking corners.

In the lower, electrical generation section of the panel, separated from the still by the product divider, is mounted a multiwall container, with the inlet feed water passing through the outer section and the produced potable water being stored in the central section. A solar PV cell is mounted on top of the multiwall container. The glass cover also seals this chamber against the frame sealing edge and also the upper element of the product divider. In this manner the inlet feed water is preheated by extracting heat energy from the solar PV panel to improve its operating efficiency, and then recovering additional heat energy from the potable water and finally recovering heat energy conducted from the side walls of the panel as it travels through the conduits adjacent to the side walls, thereby significantly improving the potable water production. Electricity generated by the solar PV panel is used by the solar pump or stored in the battery for subsequent use for charging or operating electrical devices.

In operation, inlet water is pumped to the multi-function solar panel, preferably using a variable speed positive displacement pump activated and powered from the solar PV panel. This allows inlet water to enter at a flowrate proportionate to the available radiation and to pass to the preheat system as earlier described, sequentially extracting heat from the solar PV cell, the product water storage tank, and finally from the outer walls of the panel and then pass to the inlet water distributor, located at the upper end of the assembly. The water entering the distributor may have absorbed sufficient heat energy that some portion of it will immediately flash to water vapour and the remaining water leaving the distributor will spread evenly onto the said absorber fabric. Water passing down the fabric is heated further by solar radiation, with a further portion vaporising, and the vapour generated in this part of the process, together with any previously flashed vapour generated will condense on the cooler surface of the glass as both droplets and a thin film. The condensed water runs down the underside of the glass cover until it meets the sealing surface of the product divider. The potable water then runs down into the potable water channel and from there into the storage container. Water that has passed down the absorber fabric without vaporising will have been heated to temperatures just below vaporising conditions and will also have been exposed to UV radiation, and discharges from the absorber assembly into the heated water side of the dual purpose product collector, and then leaves the panel via the heat exchange storage tank; and may be recycled with inlet feed water, or collected for use as sanitation water, or discarded.

In a further form of the invention there is a solar still for producing fresh water, including a solar panel cell (30); a water evaporation chamber (36) with a water condenser plate (glass 26) for condensing water vapour; a water collector (11) to collect condensed water vapour and fluidly connected to a condensed water storage chamber (32); a feedwater inlet water preheater chamber (31) with a feedwater inlet port fluidly connected to receive feedwater, and fluidly connected to an inlet water feed distributor (7) to distribute feedwater to the water evaporation chamber 36, a heat exchange chamber (33) to receive uncondensed water from the water evaporation chamber 36; the feedwater inlet water preheater chamber (31) thermally connected to the solar panel cell (30) and at least partially surrounding the condensed water storage chamber (32) and the heat exchange chamber (33)

Through the use of pre-tensioned locking corners to secure the glass cover, the multi-function solar panel can be opened, if necessary, with special tools, for maintenance or replacement of parts. In particular the fabric can be simply replaced by releasing the retaining rods, placing new fabric over the base and replacing the retaining rods in the locking grooves Preferably a simple mounting system is utilised, which attaches to the base and provides the multi-function solar panel with adjustable height and tilt angle features.

Rain harvesting is achieved using an extrusion mounted around the side walls, which collects all rain water running off the top surface of the multi-function solar panel and channels the water into a separate external container.

In preference, the solar panel frames utilises a thin single piece frame assembly that incorporates the side-walls themselves incorporating preheat water conduits, base, insulation and a reflective upper surface as a composite.

In preference, the multi-function solar panels that are pre-assembled and can be mounted correctly for use with a minimum of expertise and tools.

In preference, the multi-function solar panel require minimum or no maintenance during the production of distilled water and electricity.

In preference, the multi-function solar panels increases the production rate of distilled water by having the inlet water pre-heated prior to the water entering the solar still.

In preference, the inlet water is initially preheated by extracting heat from the underside of the solar PV panel thus increasing the output of the solar PV panel above what it would have otherwise have been.

In preference, the inlet water is preheated by heat exchange with the heated water discharging from the bottom of the still as it flows through or stored in a water collection tank.

In preference, the water collection tank is a tamper proof tank.

In preference, the inlet water is preheated as it flows through conduits included as an integral part of the extrusions of the outer side walls of the panel prior to discharge into the inlet water distributor.

In preference, the portion of the hot waste water stream is recycled and mixed with inlet feed water to further increase the production rate of potable water.

In preference, the upper surface of the absorber base is prepared with a grooved pattern to maintain the distribution of water across the total surface of the absorber; and to utilise a fabric cover of the absorber base with specific emittance characteristics, and retained on the absorber base using locking channels incorporated in the base, and retaining rods having an interference fit in the locking channels.

The multi-function solar panel can be used in times of wet weather to harvest rainwater and store it separately, significantly adding to the potential production of potable water.

In some embodiments, the multi-function solar panel will produce non-potable hot water for sanitation use, being the heated water discharging from the bottom of the still which has been exposed to the sun's UV radiation.

In some embodiments the present invention will, in conjunction with the production of potable water, generate electricity that can be, in part utilised in the process of water supply to the multi-function solar panel and in part be stored for utilisation with other devices.

In some embodiments the present invention may have the electrical generation section mounted at the top or on either side of the multifunction solar utilities panel, with the solar PV cell mounted directly on top of a thin heat exchange tank through which the inlet water passes. The solar still is mounted below or to the side of the electrical generation section respectively.

In a further form of the invention there is a system/apparatus when used for reclaiming contaminated water including:
  a frame;
  an infrared absorbing panel;
  a water inlet distributor located at a first end of the infrared absorbing panel to distribute contaminated water to the infrared absorbing panel to evaporate at least a portion of the contaminated water;
  an evaporated water collection surface;
  a water product collector located downstream of the water inlet distributor;
  wherein the water product collector includes a first channel and second channel separated by a ridge, the second channel being located above a plane of the first channel, the first channel fluidly connected to a waste water outlet and collects water passing over the infrared absorbing panel and the second channel fluidly connected to a potable water outlet, and located so as to collect water from the evaporated water collection surface.

BRIEF DESCRIPTION OF THE INVENTION

In order to more fully describe the invention reference will now be made to the accompanying drawings in which:

FIG. 1 is a plan view of a multi-function solar panel;

FIG. 2 is a side view from the left hand side;

FIG. 3 is a partial side view from the right hand or inlet side;

DESCRIPTION

Figure 4:
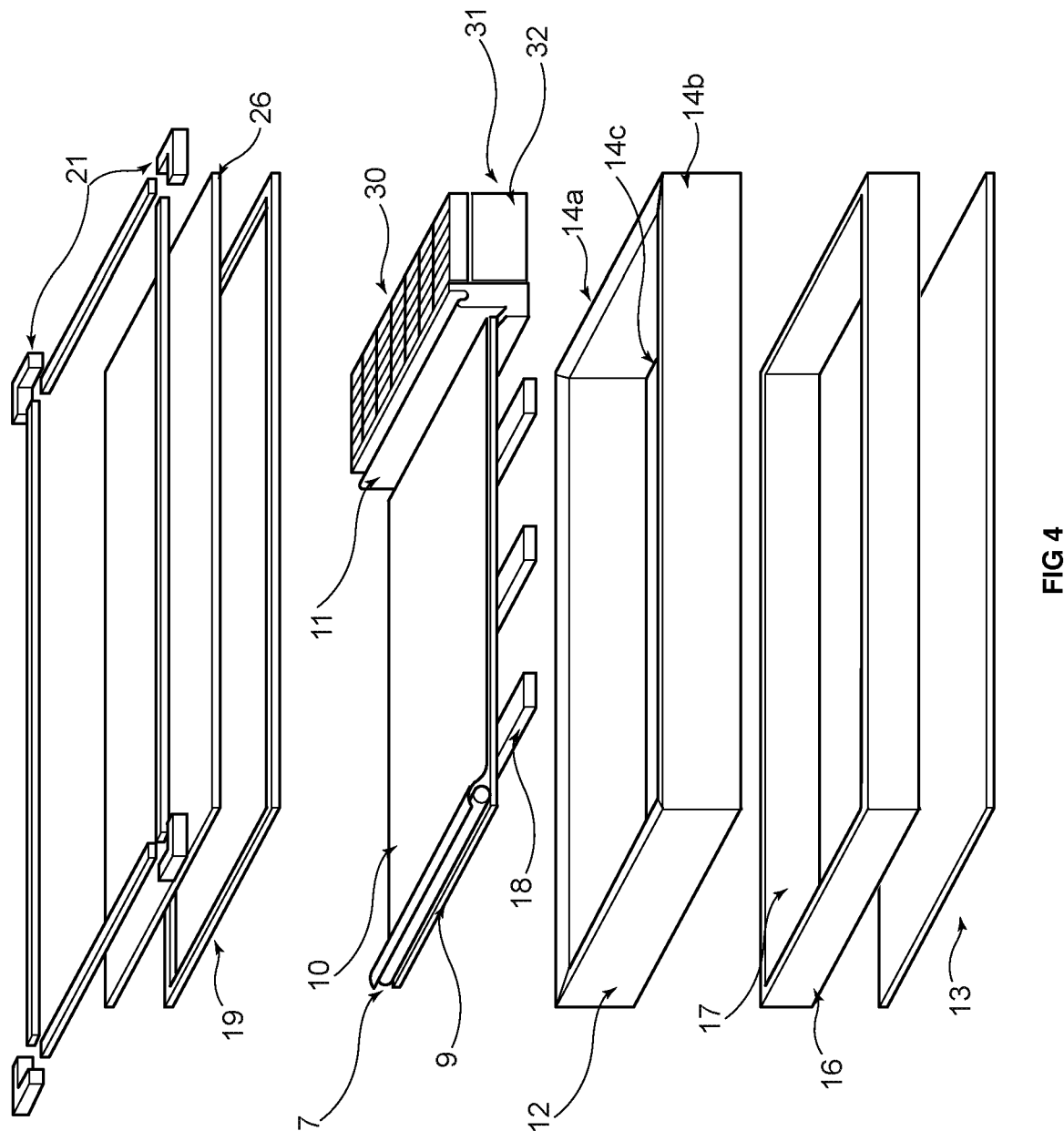
FIG. 4 is an exploded view of the components of the multi-function panel.

As used herein "photovoltaic" or "PV", refers to the direct conversion of light energy into electricity. As used herein the term "photovoltaic cell" or "PV cell" refers to a photovoltaic element. The term "solar cell" is also used to refer to a photovoltaic cell.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

FIG. 1 shows a plan view of the multi-function solar panel 1 showing the external casing 12, and the glass 26, which is retained by L-shaped metal strips 20 and corner retaining clips 21. Visible beneath the glass cover are the inlet water distributor 7, the low IR absorber fabric 10, the dual purpose product collector and chamber seal 11, having a sealing surface 11d and the two product collection channels 11a and 11b. also visible is the solar photovoltaic (PV) cell 30.

FIG. 2 shows cross sectional view AA of the multi-function solar panel, identifying the frame assembly 2, including the insulation 16, and the reflective surface 17; and also the solar glass cover 26 and the retaining clips 21. Below the water evaporation chamber 36 is located the absorber assembly 8, which rests on insulating blocks 18a, 18b and 18c. The insulating block 18a adjacent to the inlet water distributor 7 is glued to both the rigid absorber base 9, and the reflective metal surface 17, and the remaining insulating blocks 18b and 18c are glued only to the rigid absorber base 9, and rest on the reflective metal surface 17, and are free to move as the elements of the multi-function solar panel 1 expand and contract. The inlet water preheater 31 is located around the potable water storage chamber 32, and below the solar PV panel 30 so that heat from the PV panel 30 can be transferred to the inlet water preheater 31 by conduction, with incoming water absorbing heat from each before passing to a conduit, adjacent to the side walls of the panel 1 to absorb conductive heat energy and finally passing to the inlet water distributor 7. In further embodiments of the present invention, additional conduits may be located in the side walls of the panel 1 to provide additional opportunity for incoming water to gaining conducted heat from the side walls of the panel.

The multi-function solar panel absorber assembly 8 is formed with a rigid absorber base 9, over which is stretched the low IR reflecting absorber fabric 10 using retaining rods and locking grooves to hold the fabric in position. The water from the inlet water preheater 31 enters the inlet water distributor 7 (via an internal pipe) with a portion of the water flashing immediately into water vapour and the remaining water flowing evenly and slowly onto the absorber fabric 10. As the water flows slowly through the absorber fabric 10, a portion is evaporated and collects on the on the glass 26 (evaporated water collection surface) and the remaining concentrated discharge water passes into discharge water collector side 11a of the dual purpose product collector and seal 11, and discharges through the internal channel 11f and out through the side wall at inlet/outlet ports, either to be used as hot sanitation water, or to be passed through a further still, or to be recycled with inlet feed water or to waste. The distilled potable water collected on the glass 26 runs under gravity to the lower end of the glass 26.1 where it contacts the upper sealing edge 11d, of the dual purpose product collector and seal 11, and then runs down into the distilled water collector side 11b of the dual purpose product collector 11, and either discharges through inlet/outlet ports, or is stored in the potable water storage vessel 32 in the water storage unit 40.

FIG. 3 shows the partial cross sectional view BB which details the dual purpose product divider and seal 11, and the inlet ports 31a, 32a, 33a and outlet ports 32b, 33b, 33c of the heat exchange and storage unit. Water that has condensed on the underside of the glass cover 26, tracks down the glass until it meets the seal 11d, where it then aggregates and runs into the potable water channel 11b, and through the internal channel 11f in the dual purpose product divider 11 and enters the potable water container through inlet port 32a, and heat exchanges with inlet feed water. Potable water exits through port 32b, through a flow measuring device and solenoid valve when activated. In one embodiment, the solenoid valve can be activated by an operatively pay as you go (PAYG) system. Excess water that has not evaporated exits from the edge of the rigid absorber base 9, and fabric 10, and enters the waste water channel 11a of the dual purpose product divider and seal 11, and then through the internal channel 11e in the dual purpose product divider 11 and enters the waste water container through inlet port 33a, and heat exchanges with the inlet feed water. The waste water discharges continuously through the exit port 33b, and a liquid seal, and thence to a port on the exterior of the panel. Inlet non-potable feed water, from outside of the solar still, enters through a port on the exterior of the panel and thence to inlet port 31a fluidly connected to the heat exchange chamber/container 31 and the preheated feed water exits from outlet port 31b and is transferred by internal conduit 37 to the inlet water feed distributor 7.

FIG. 4 provides an exploded view of the assembly of the multi-function solar panel 1.

Figure 5:
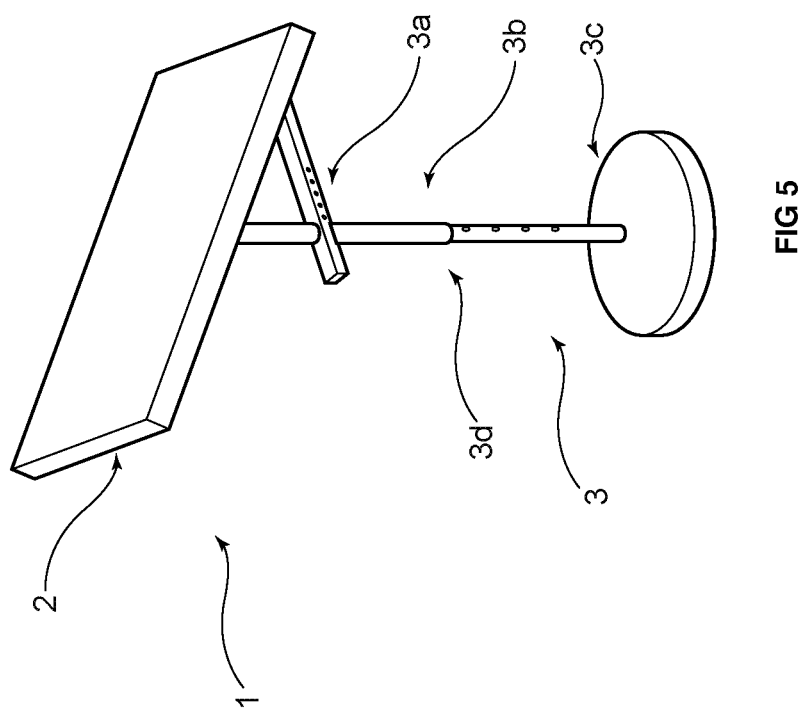
FIG. 5 is a view of the stand with adjustable height and tilt angle.

Referring to FIG. 5 the multi-function solar panel 1 includes a frame assembly 2, supported in this example on stand 3 with adjustable features 3a and 3b. The lower end of the frame can be positioned between 0.5 m and 1.25 m from the ground, or from any other mounting surface, to facilitate the placement of containers for collection of the produced potable water and hot sanitation water. Additionally the multi-function solar panel 1 may be inclined to specific angles to the horizontal so that the multi-function solar panel 1 operates at the appropriate angle for the specific location (being the latitude at that location). In one embodiment the base of the stand 3c is a PVC container that can be filled with sand to provide ballast, and the telescopic height adjustment 3d, is PVC pipe.

Figure 6:
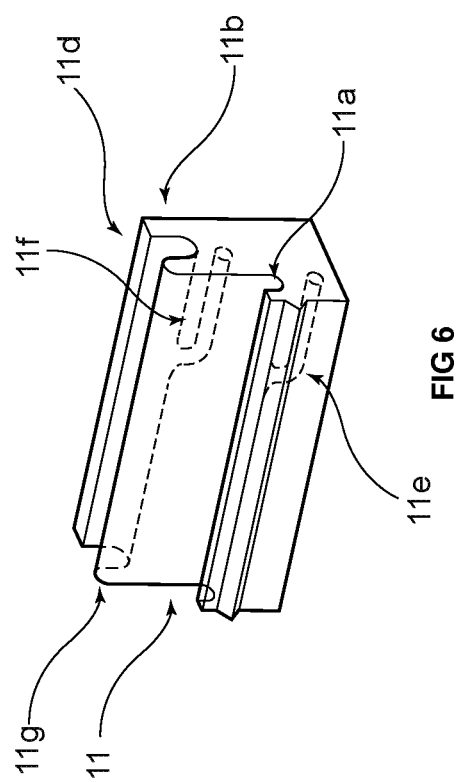
FIG. 6 shows the dual purpose product collector and chamber seal.

FIG. 6 shows detail of the dual purpose product collector and seal 11. Both potable water collected in channel 11b, and waste water collected in channel 11a flow into discharge pipes at the rear and to the right hand side of the product collector by way of the internal channels 11e or 11f respectively. These pipes then connect to the heat exchange and storage chambers 33 and 32 respectively of the water storage unit 40. Product separation and the avoidance of cross contamination is achieved by utilising separate collection channels 11a and 11b, separated with a barrier 11g forming only a narrow gap with the underside of the glass cover 26, which acts as a water condensing plate, to allow only potable water to flow to the seal 11d, and thence into the upper channel 11b. In other embodiments of the present invention additional collection channels may be utilised.

Figure 7:
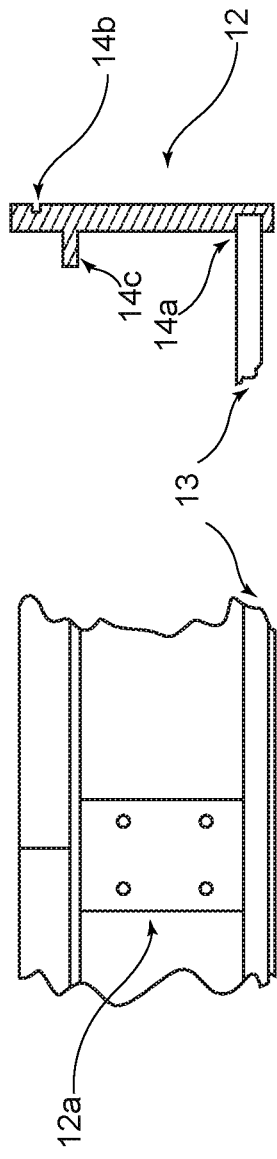
FIG. 7 shows the details of the frame assembly.

FIG. 7 shows the frame assembly 2 that consists of a single ribbon of metal 12 incorporating two recessed grooves 14a, and 14b, and a lateral flange 14c, that forms the sides of the frame assembly 21. The ribbon of metal 12 is shaped around the base plate 13 which fits into one of the said two grooves 14a, 14b. The dimensions of the ribbon of metal 12, are such that the ends meet and are secured by rivets, or other suitable fastening means, through a backing plate 12a. Alternatively extruded sections can be used, being riveted together, or otherwise joined at the corners. The frame assembly 2 is a composite structure and includes the insulation 16 and reflecting metal surface 17. It will be appreciated that the frame may be manufactured from other suitable materials, such as, but not limited to, plastics material.

Figure 8:
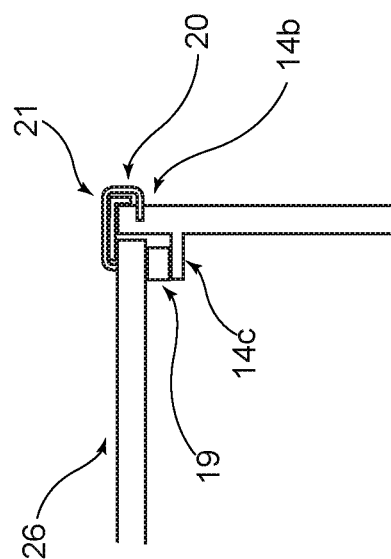
FIG. 8 shows the detail of the sealing and retention of the glass cover.

FIG. 8 shows the detail of the glass cover sealing mechanism whereby two sided adhesive closed cell tape 19 is attached to the lateral flange 14c, and then the edge of the glass 26 rests on said tape, and the glass 26 is retained by L shaped metal strips 20 and corner retaining clips 21 that fit into the second of the recessed grooves 14b, and over L shaped metal strips 20. This form of assembly requires no screws or rivets in construction and permits access to the internal components, if desired, for cleaning or replacement, without destruction of any component using a special access tool.

Figure 9:
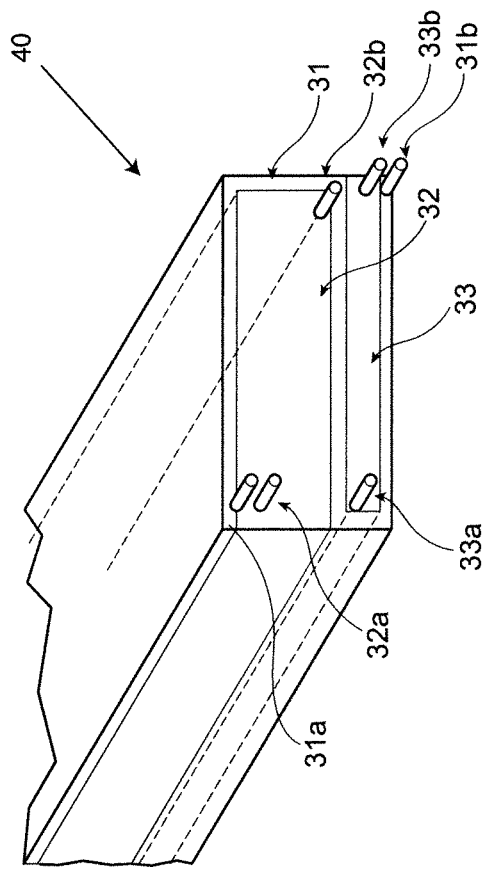
FIG. 9 shows the detail of the heat exchange and storage tanks.

FIG. 9 shows the construction of the heat exchange and potable water storage unit 40, which includes a potable storage chamber 32 and a heat exchange chamber 33. Within a single outer shell is contained a channel 31 for the inlet feed water, a separate tank for potable water 32 and a further separate channel for waste water in the heat exchange chamber 33. Inlet water, from outside of the solar still, flows in to the channel 31 from inlet port 31a and passes through the channel or path gaining heat energy firstly from the solar PV cell 30, then from the potable water store 32 and then from the waste water discharge tank which is the heat exchange chamber 33 before exiting from outlet port 31b and passing up the conduit 37 on the side wall of the panel, absorbing further heat energy from the side walls and then to the inlet water distributor 7. Potable water enters its storage 32 through inlet port 32a and leaves through outlet port 32b. Similarly waste water enters its channel in the heat exchange chamber 33 through inlet port 33a and exits through outlet port 33b.

Figure 10:
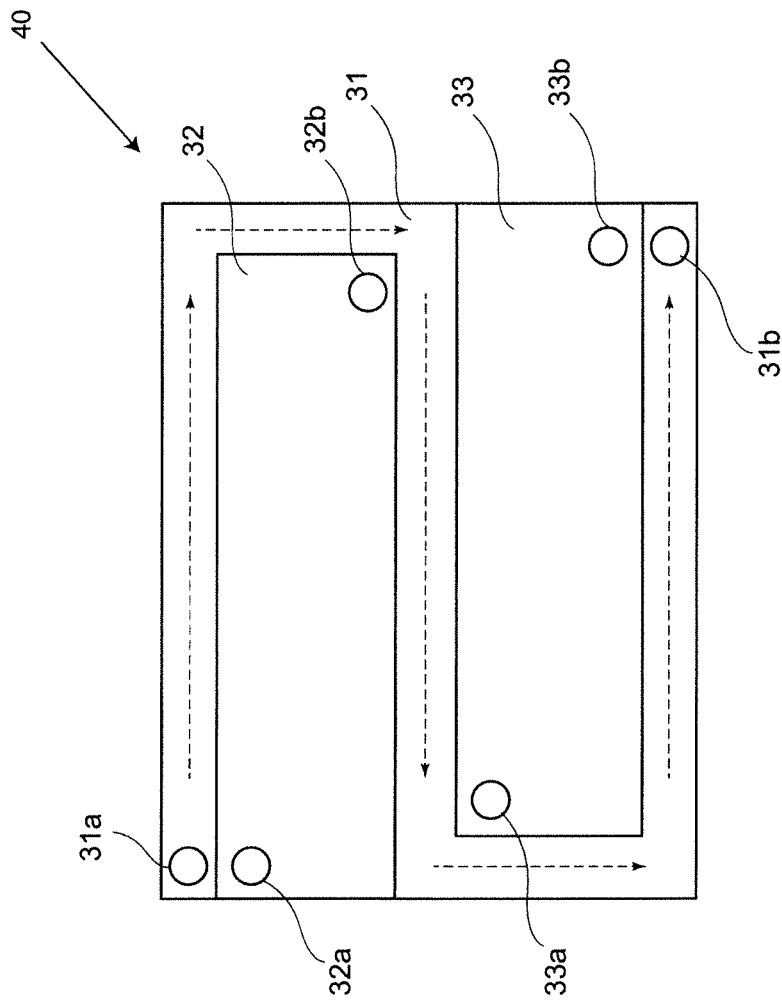
FIG. 10 is a side view of the detail of the heat exchange and storage tanks of FIG. 9.

FIG. 10 shows the sideview of the heat exchange and potable water storage unit 40 with the flow path of the water through the channel 31 from the inlet 31a through to the outlet port 33b and through to the inlet water distributor 7.

In operation, once the solar PV panel receives sufficient radiation, electrical energy is generated with part supplying a solar feed pump, which will automatically start and provide a continuous flow of water, proportionate in volume to the available radiation, into the multi-function solar panel 1; and part that will charge a remote battery to provide other electrical services. The rate at which water flows and the preparation of the absorber base surface is sufficient to provide even water distribution across the entirety of the absorber fabric 10 and to carry most of the unwanted contaminants into the discharge water collector, so that the absorber fabric 10 requires infrequent cleaning, if at all.

The glass sheet 26 is preferably of 2.5 mm thick toughened solar glass with a very low content of ferrous and ferric oxide. Such glass exhibits high transmittance for radiation in the ultra-violet (0.35 to 0.40 microns) and the visible spectrum (0.40 to 0.70 microns) and the near infrared region from about 0.70 to 1.5 microns. The infrared radiation heats the liquid, the ultra violet radiation kills most of the common bacteria. Neither bacteria nor most chemicals and radioactive isotopes can cross a vapour path and consequently remain in the water stream, with bacteria becoming sterilised. All impurities and bacteria are then flushed away through the discharge water collector once collected in the channel or zone 11a of the dual purpose water product collector 11. Initially a portion of the water may flash (evaporate), with the remaining water flowing onto the fabric 10, of which a further portion vaporises as the water stream is heated on its passage through the fabric 10, and the vapourised water condenses on the cooler underside of the glass cover 26, then coalesces into droplets or streams which travel to the product divider sealing surface with the glass 11d, to be collected in the potable water channel or zone 11b of the dual purpose water product collector 11.

Within the third chamber is stored, along with the heat exchange storage tank system, the dispensing controller for potable water, the communication system for both the PAYG system and data collection devices and the electrical cabling from the solar PV panel. A range of data collection devices can be incorporated into both the solar still or the solar PV section of the multi-function solar panel.

Thus, it can be seen there is provided by this invention a multi-function solar panel to purify water, to produce hot water and produce electricity, that can be operated within the PAYG environment, and additionally provide data collection to contribute to the Internet of Things (IoT) by way of networking with other suitable appliances or electronics, software, sensors or actuators.

The feed water can be water from a stream, water from mining industries, contaminated ground water, radio active water or sea water. The panels can be arranged in parallel or in series, with the discharge water from one panel being fed to the next panel, as feed water for that panel.

During wet weather rain will fall onto the sloping surface of the multi-function solar panel, and run off over the edges, preferentially towards the lowest edge of the panel. The flexible extrusion fitted to the side walls acts as a collection gutter, and harvests the rain water falling on the multi-function solar panel, directing it to the outlet set into the extrusion.

The present invention extends the concept of the solar still into a mufti-function solar panel that provides multiple functionality to deliver the fundamental resources, potable water and electricity, required by everyone.

Although some alternate forms of the invention have been described it is to be realised the invention is not to be limited thereto but can include modifications and variations falling within the spirit and scope of the invention defined by the appended claims.

1. A multi-function solar panel when used for distilling water, the solar panel including at least three inner chambers, is mounted so that the solar still section is the uppermost chamber. In this chamber the feed water distributor is at a higher elevation than the discharge product collector, and the still produces potable water through a process of flashing and evaporation of feed water followed by condensation on the glass cover and collection. In a lower chamber electricity is generated using photovoltaic cells, below which in a third chamber, inlet feed water for the upper chamber is partially pre-heated and further preheated in conduits adjacent to the side walls of the panel.

2. The multi-function solar panel, as defined in claim 1, that includes a frame supporting an absorber in one chamber and a heat exchange tank and solar PV cell in another chamber; with a glass sheet enclosing the top of the chambers. The frame assembly is of composite construction and consists of a single ribbon of metal incorporating two recessed grooves, and a lateral flange, which forms the sides of the frame assembly. The ribbon of metal is shaped around the base plate which fits into one of the said two grooves. The dimensions of the ribbon of metal, are such that the ends meet and are secured by rivets through a backing plate. The frame assembly includes the thermal insulation and reflecting metal surface as a composite.

3. The multi-function solar panel, as defined in claim 1, whereby the frame includes a base, the base supporting an absorber comprising of a low IR reflecting, absorber fabric supported on a black body. This absorber fabric allows UV light to pass to the black body which then radiates IR energy back to the fabric (and equally to the reflecting metal surface on the underside of the absorber assembly). The reflecting metal surface reflects the IR energy back to the black body, retaining this energy in the multi-function solar panel.

4. The multi-function solar panel as defined in claim 1 wherein the multi-function solar panel is supported on a stand with simple pre-calibrated adjustment features such that the lower end of the frame can be positioned at varying heights from the ground, or from any other mounting surface, to facilitate water collection and additionally, the multi-function solar panel may be tilted to specific angles to the horizontal so that the still can be inclined at the appropriate angle for the specific location (being the latitude at that location).

5. The multi-function solar panel as defined in claim 3, wherein the upper surface of the absorber plate is prepared in a manner that enhances the maintenance of water distribution and heat transfer across the absorber, and provides locking channels to retain the fabric.

6. The multi-function solar panel as defined in claim 3, wherein the absorber assembly rests on its insulating blocks and the insulating block adjacent to the inlet water distributor is glued fixed to the reflective metal surface, but the remaining insulating blocks rest on the reflective metal surface, and are free to move as the elements of the multi-function solar panel expand and contract due to temperature changes.

7. The multi-function solar panel as defined in claim 3, wherein the water entering the still is preheated prior to flowing over the absorber. Inlet feed water passes into a channel beneath the solar PV panel reducing its operating temperature and thereby improving its performance; the inlet feed water then heat exchanges with potable water and the waste water, in each case recovering heat energy from these streams. The inlet feed water then passes to conduits located adjacent to the sidewalls of the panel to absorb additional heat energy on its passage to the inlet water distributor. Through this preheating the production rate of potable water is increased.

8. The multi function solar panel as described in Claim 1 in which portion of the hot waste water stream is recycled and mixed with inlet feed water to further increase the production rate of potable water.

9. The multi function solar panel as described in Claim 1 where the design of the heat exchange water storage assembly in the third chamber is constructed so that the stored water cannot be illegally accessed from outside the panel by penetrating the assembly without contaminating the potable water with either inlet feed water or hot waste water.

10. The multi-function solar panel as defined in claim 7 wherein the stored potable water cannot be illegally accessed from the outside of the panel without either contaminating the potable water with non potable inlet feed water or non potable waste water.

11. The multi-function solar panel as defined in claim 2, wherein the frame further includes side members and end members joined at the respective corners by screws or rivets.

12. The multi-function solar panel as defined in claim 2, wherein the single ribbon of metal forming the frame is extruded and incorporates the grooves and the flange.

13. The multi function solar panel as defined by Claim 2 whereby the walls, base and internal features are produced as a single moulding using thermoplastic resins.

14. A multi-function solar panel as defined in claim 2, wherein the glass cover can be removed for access to the internal components, or to replace the fabric or a damaged glass cover, using a special tool, without causing damage to any other of the components of the multi-function solar panel.

15. The multi-function solar panel as defined in claim 2, whereby a detachable flexible extrusion can be placed around the side wall of the multi-function solar panel so that rainwater may be harvested.

16. A system/apparatus when used for reclaiming contaminated water including:
a frame;
an infrared absorbing panel;
a water inlet distributor located at a first end of the infrared absorbing panel to distribute contaminated water to the infrared absorbing panel to generate water vapour from at least a portion of the contaminated water;
a water vapour condensation surface;
a water product collector located downstream of the water inlet distributor,
wherein the water product collector includes a first channel and second channel separated by a barrier, the second channel being located above a plane of the first channel, the first channel fluidly connected to a waste water outlet and collects water passing over the infrared absorbing panel and the second channel fluidly connected to a potable water outlet, and located so as to collect water from the water vapour condensation surface.

The invention claimed is:

1. A solar still for producing fresh water, including
a solar panel cell (30);
a water evaporation chamber (36) with a water condenser plate (26) for condensing water vapour;
a water collector (11) to collect condensed water vapour and fluidly connected to a condensed water storage chamber (32);
a feedwater inlet water preheater chamber (31) with a feedwater inlet port fluidly connected to receive feedwater, and fluidly connected to an inlet water feed distributor (7) to distribute feedwater to the water evaporation chamber (36)
a heat exchange chamber (33) to receive water that did not evaporate in the water evaporation chamber (36);
the feedwater inlet water preheater chamber (31) thermally connected to the solar panel cell (30) and at least partially surrounding the condensed water storage chamber (32) and the heat exchange chamber (33).

2. The solar still of claim 1, wherein the water collector further includes:
a first water collecting channel (11*a*) and a second water collecting channel (11*b*);
the first water collecting channel (11*a*) to collect water vapour from the water condenser plate (26) and positioned lower than the second water collecting channel (11*b*);
the first water collecting channel (11*a*) fluidly connected to the heat exchange chamber (33);
the second water collecting channel (11*b*) fluidly connected to the condensed water storage chamber (32).

3. The solar still of claim 1, further including an infrared absorbing material positioned in the water evaporation chamber, the inlet water feed distributor (7) distributing feedwater over the infrared absorbing material.

4. The solar still of claim 3, further including a reflective material positioned below the infrared absorbing material.

5. The solar still of claim 1, wherein the water collector (11) creates a seal between the water evaporation chamber (36) and the solar panel cell (30).

6. The solar still of claim 1, further including a surrounding frame.

7. The solar still of claim 6, wherein the frame includes conduits or channels to fluidly connect the inlet water preheater chamber (31) to the inlet water feed distributor (7).

8. The solar still claim 6, where in the solar still is mounted to an adjustable base to provide adjustment of at least one of height ands angle of the frame.

9. The solar still of claim 1, wherein the water condenser plate (26) is removably secured to the water evaporation chamber (36).

10. The solar still of claim 1, further including a collection gutter located about an outer surface and fluidly connected to the inlet water preheater 31 so as to harvest rainwater.

11. The solar still of claim 1, further including a dispensing means to dispense water from the storage chamber (32).

12. The solar still of claim 1, further including an inlet water pump to pump water into the feedwater inlet water preheater chamber (31).

13. The solar still of claim 1, wherein the inlet water pump is powered by the solar panel cell (30).

14. The solar still of claim 1, wherein the dispensing means includes a controllable vale, the valve being operably connected to a dispensing system, the dispensing system being activated by a connected pay-as-you-go (PAYG) system.

* * * * *